Feb. 2, 1971 R. J. RENN 3,559,388
BELT-TYPE GRAIN PICK-UP

Filed May 10, 1968 2 Sheets-Sheet 2

INVENTOR
REYNOLD J. RENN
BY *Smart & Biggar*
ATTORNEYS.

United States Patent Office 3,559,388
Patented Feb. 2, 1971

3,559,388
BELT-TYPE GRAIN PICK-UP
Reynold John Renn, Calgary, Alberta, Canada, assignor to Renn-Cupit Industries Ltd., Calgary, Alberta, Canada
Filed May 10, 1968, Ser. No. 728,131
Int. Cl. A01d 87/02
U.S. Cl. 56—350
14 Claims

ABSTRACT OF THE DISCLOSURE

An endless conveyor belt type grain pick-up provided with flexible pick-up tynes and a driven stripper roller for removing grain from the tynes. The stripper roller is located below the discharge end of the conveyor and kept a constant distance therefrom. The angular relationship of the stripper roller and discharge end of the conveyor relative to the ground is variable.

BACKGROUND OF THE INVENTION

This invention relates to belt-type pick-ups for moving harvesters.

In one method of harvesting grain the grain is first cut and laid out in windrows to dry. Subsequently, a combine harvester moves along the windrows collecting the grain and threshing it to separate the seed from the chaff of straw and weeds. Since most combine harvesters are designed to cut the grain and then to thresh it, where the grain has previously been cut and laid out in windrows, it is necessary to provide a pick-up device to deliver the grain to the receiving table of the combine.

Known belt type pick-ups comprise a conveyor belt and tynes fixed to the conveyor belt which collect the grain from the ground and deliver it to the receiving table. The arrangement of the parts of such pick-ups has been such that not all the grain which is picked up is delivered to the table but a certain amount, and in some cases a significant amount, is lost back to the ground. It has been found that the reason for this loss of grain is that heretofore grain pick-ups were desinged generally for one type of grain and that when used for other types of grain the percentage loss increased.

It has been determined that these earlier designs necessarily incorporated a number of structural compromises in an attempt to accommodate the various grain types and that these compromises effectively reduced the pick-up and transfer efficiency for all grains.

SUMMARY OF THE INVENTION

According to the present invention there is provided in a belt type grain pick-up having front and rear conveyor rollers, a conveyor belt extending around said rollers and provided with flexible gain pick-up tynes, and a driven stripper roller for removing grain from said tynes, the improvement in which said stripper roller is located below said rear conveyor roller and means are provided for varying the angular relationship of the stripper and rear rollers relative to the ground, said means being adapted to maintain the stripper roller and rear roller at a constant spacing.

In this fashion the spacing between the vertical tangent to the rear roller and vertical tangent to the front of the stripper roller may be varied, to accommodate the handling of various grains.

In a preferred form of the invention the stripper and rear rollers are mounted in a pair of spaced brackets and the brackets are pivotally mounted on the table of the combine harvester so that on pivoting the brackets about the table the angular relationship of the stripper and rear rollers is varied.

A further improvement in the grain pick-up is obtained are provided for keeping the stripper roller clear of entangled material. Preferably a blade extends along the stripper roller in close proximity thereto.

BRIEF DESCRIPTION OF THE DRAWINGS

A preferred embodiment of the invention will now be described by way of example with reference to the accompanying figures in which.

DESCRIPTION OF THE PREFERRED EMBODIMENT

Figure 1:
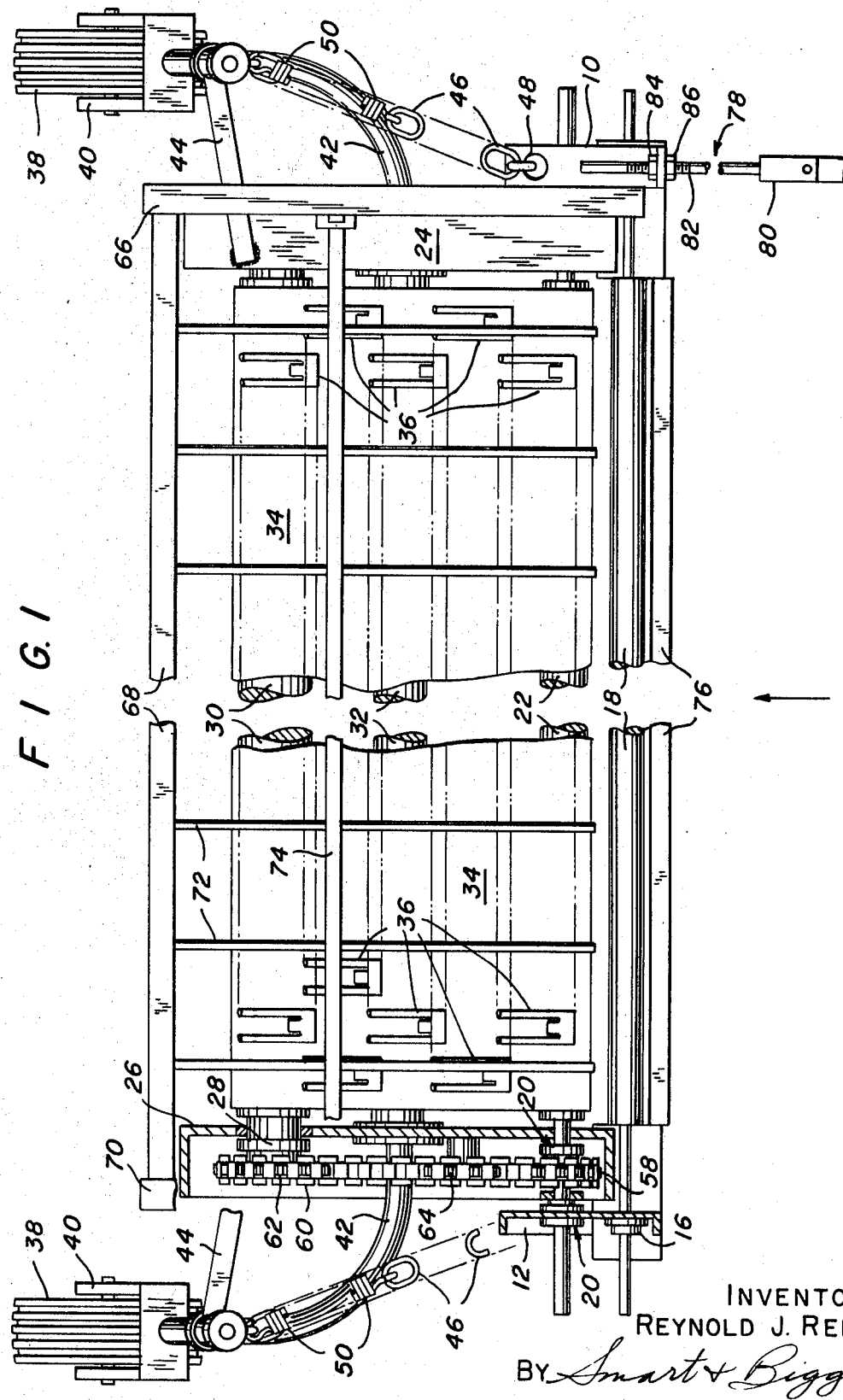
FIG. 1 is a top view, partly cut away, of the preferred embodiment.

Referring now to the drawings, the grain pick-up illustrated comprises side bracket members 10 and 12 which are connected together and held in laterally spaced-apart fashion by a cross beam 14. Rotatably mounted in bearings 16 in brackets 10 and 12 is a stripper roller 18. Also mounted, in bearing means 20, in the side brackets 10 and 12 above and slightly forwardly of the stripper roller, as seen in the direction of movement of the vehicle as shown by arrow A, is a rear conveyor roller 22.

Figure 2:
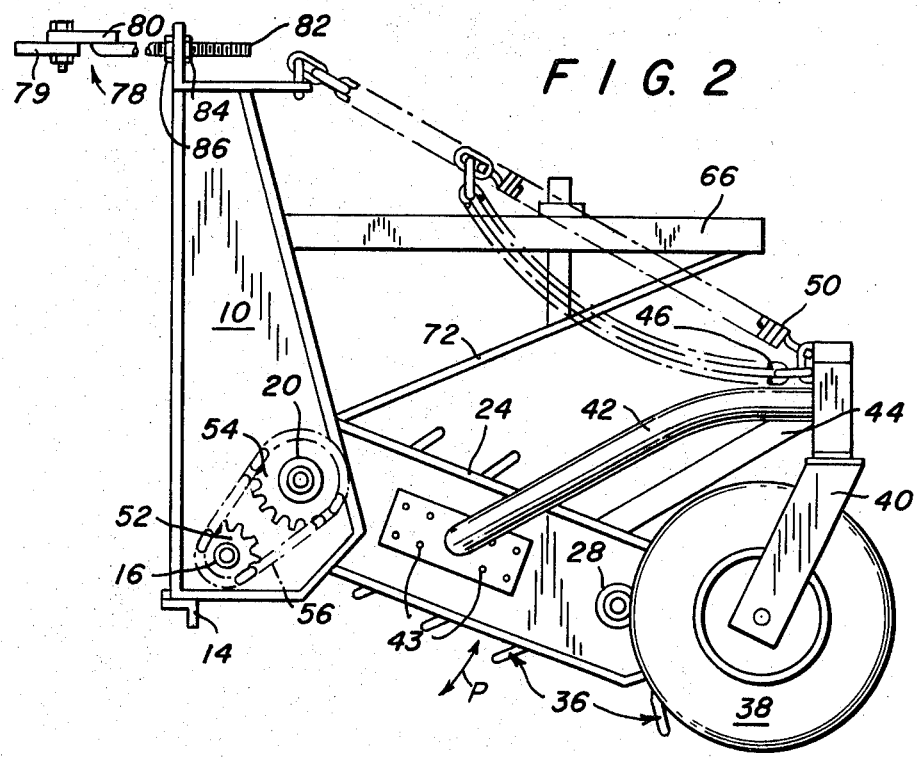
FIG. 2 is an end view, also partly cut away, of the embodiment shown in FIG. 1.

Two side frames 24 and 26 are rotatably mounted on the roller 22 and in the bearing means 20 for pivotal movement as indicated by the arrow P in FIG. 2. Each side frame extends forwardly from the rear roller. Rotatably mounted in the forward end of the side frames in bearings 28 is a front conveyor roller 30. The bearings 28 are such as to allow relative spherical movement between the side frames 24, 26 and the roller 30 during motion over uneven ground. The side frames are spaced apart by a member 32 which is clamped at either end to the inner faces of the side frames.

Extending around and between the front and rear conveyor rollers 22 and 30 are a plurality of adjacent conveyor belt sections 34. Each conveyor belt section has provided thereupon a plurality of tynes 36 each of which comprises a base member which is secured to its associated belt by a nut and bolt, and two tyne portions extending from the base portion at an acute angle to the belt. Each tyne portion comprises a major portion 36a and a minor end portion 36b which is at a larger acute angle to the belt than the major portion of the tyne.

Supporting wheels 38 are mounted one on each side frame. Each wheel 38 is mounted on an axle in a yoke 40. The yoke 40 is pivotally mounted in a supporting member 42 which is secured to the side frames using common securing means 43 with the spacing member 32. From the top of the yoke is a strut 44 which is secured to the top of the side frame at the forward end thereof. Extending from the yoke 40 to the top of each side bracket member is a chain 46 which fits in a keyhole 48 formed in the top of the side bracket members. A spring 50 is connected between the yoke 40 and a portion of the spring to provide resilience in the supporting system.

Power for the pick-up is delivered to the stripper roller 18 from a source not shown. Mounted on the ends of the rollers 18 and 22 adjacent the side bracket 10 are sprockets 52 and 54. A chain 56 interconnects the two sprockets 52 and 54 to transmit drive from the roller 18 to the roller 22. On the other end of the roller 22 is a further sprocket 58 which supplies drive via chain 60 to a sprocket 62 mounted on the end of front conveyor roller 30. The chain 60 is tensioned by an idler gear 64.

Mounted above the belt portion of the pick-up is a windbar assembly. This assembly comprises three support members 66, 68 and 70 secured in the form of a U to the side bracket members 10 and 12. Mounted on the cross member 68 and extending rearwardly therefrom are a plurality of bars 72 which rest upon the conveyor belt as it extends over the rear roller 22. A weight bar 74 is slidably mounted for up and down movement in ways on the bars 66 and 70 and rests on the upper surfaces of the bars 72 to hold them down.

Secured to the cross member 14 and extending along and adjacent to the stripper roller 18 is a stripper angle 76. The stripper angle is adjustably mounted for vertical and horizontal movement in relation to the stripper roller to allow it to occupy any one of a number of positions in relation to the stripper roller. The adjustable mounting means are not illustrated.

When it is desired to use the pick-up in connection with a combine harvester the member 14 is located on the leading edge of the reception table 77 of the harvester in such a manner that it is able to pivot about a horizontal axis as indicated by the arrow $P_2$, on the table. Brace members 78 are secured between the upper edge of each side bracket member 10 and 12 and the body 79 of the combine harvester. Each brace 78 includes a connection 80 secured to the combine and a threaded portion 82 which extends through a hole in the top of each side bracket member. Nuts 84 and 86 are secured one on each side of the side bracket member. It will immediately be apparent that adjustment of the nuts 84 and 86 will cause the side bracket members 10, 12 to pivot about the rear edge of the cross member 14 and that this will cause the angular relationship of the rollers 18 and 22 with reference to the ground to vary. That is to say, an imaginary line joining the centers of rollers 18 and 22 will be rotated and will adopt varying angular relationships with the ground.

In the embodiment illustrated the means for varying the angular relationship of the stripper and rear rollers relative to the ground are the side brackets 10, 12 with their means to receive brace 78 with its nuts 84 and 86.

In operation of the grain pick-up, the various elements mentioned have peculiar and novel functions.

The stripper roller 18 is of such a size that it works in conjunction with the bent portion of the nylon tynes 36 so as to maximize stripping. This will be further discussed below. The stripper roller is rotated in an anticlockwise direction opposite to the direction of movement of the nylon tynes and is located in a position such that it does not begin to strip grain from the nylon tynes until such time as the nylon tynes are below a horizontal position relative to the rear roller 22. Preferably, the stripper roller engaegs only the minor end portion 36b of the tynes. Further, the spacing of the rollers 18 and 22 is constant regardless of their respective positions relative to any vertical or horizontal tangent. In use this ensures that no grain is pinched between the stripper roller and the tynes or between the tynes and the conveyor belt portions 34.

As indicated above, the nylon tynes are so shaped as to match the diameter of the stripper roll. This means that the discharge of grain from the strippers is gentle and smooth release of the grain is accomplished so that there is no shelling of the grain during the stripping action. Also the nylon tyne is of such a shape and angle with relation to the belt that on rotation about the front roller the first contact of the tynes with the ground is when the tyne is generally at about 90° to the ground. This arrangement ensures that any stones, rocks or other foreign terrain obstructions cause the nylon tyne to flex prior to picking up any grain from the ground. In this manner the stone pick-up which is a disadvantage of previous grain pick-ups is substantially reduced if not eliminated.

Figure 3:
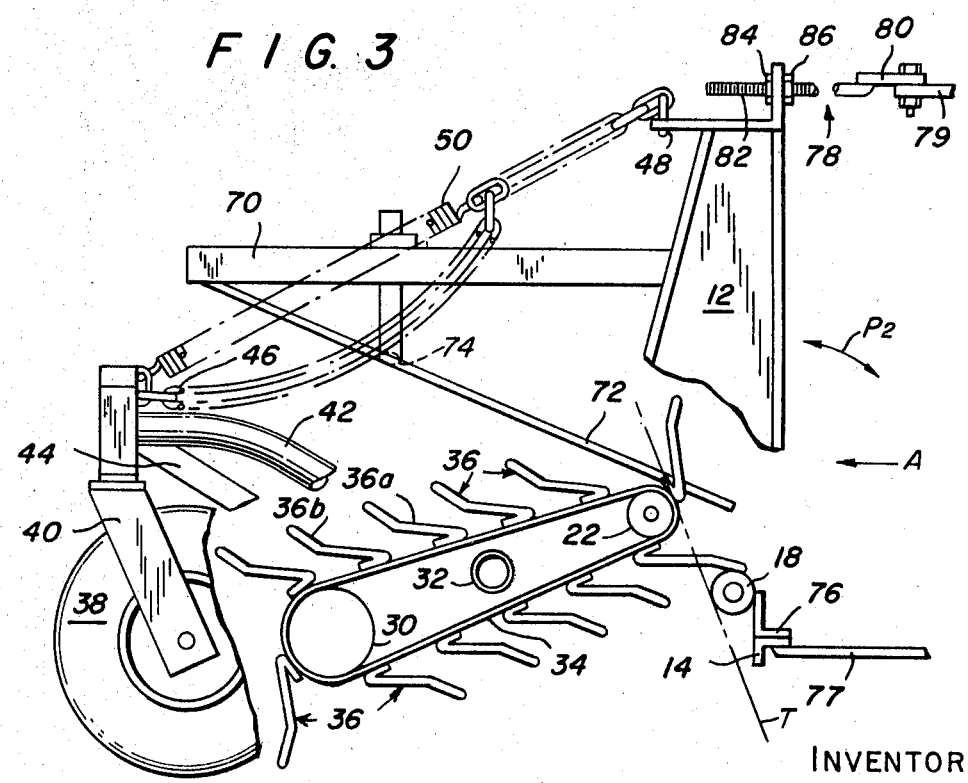
FIG. 3 is a view of the other end, also partly cut away, of the embodiment of FIG. 1.

It is also mentioned above that the relative spacing of the stripper roll and rear roller was constant. Also as described above, means are provided for adjusting the relative angular position of the stripper and rear rolls in relation to the ground. It has been found that there is a critical value for various types of grains. With a coarse grain material it is preferable that the angle between the common tangent T (FIG. 3) to the rollers and the ground be something less than 90° so that a gap is seen between adjacent vertical tangents to the stripper and rear rollers. However, with fine crops such as grass it has been found that, using the arrangement for a coarse grain, there is a great deal of loss. Accordingly, it has been found preferable that with a fine grain such as grass there should be no gap between the leading edge of the stripper roller and the rearward edge of the rear roller. But although there is a variation in the possible angular relationship between the two rollers and the ground, the centre-to-centre distance of the two rollers is maintained so that the tynes contact the stripper roller in a constant manner.

In the consideration of the function of the stripper angle 76, it is necessary to refer again to the various types of grains which are being harvested. In a coarse grain, the effectiveness of the stripper angle, although contributing greatly to the improvement is not nearly as critical as in the harvesting of grain such as buck wheat. In this type of grain, because of its long and fine type of stalk, there is a tendency for the long stalks to wrap around the stripper roller 18. It can be very easily observed that as the grain stock tends to wrap around the stripper roller this build up will effectively change the diameter of the stripper roll and in effect cause a change in the flexing of the double nylon tynes. This build up, the change in the double nylon tynes flexing ability reduces the efficiency of the harvesting and leads to a loss of crops on the ground. The stripper angle reduces the tendency for the stripper roller to build up and consequently permits efficient grain pick up. Because of the difference in grain being harvested, this stripper bar is adjustable in both the vertical and horizontal position as has been indicated.

Finally, the double flexing nylon tynes are mounted by single securing means so that there will be no relative motion between the nylon tynes and the belt itself in a lateral sense. That is, the nylon tynes will always remain in line and will not be caught off to one side thereby giving a poor pick up. The use of the double nylon tynes enables a type of self-correction against any tendency to cock the nylon tynes to one side and this is accomplished as well when the nylon tynes flex against the stripper roller.

What I claim as my invention is:

1. In a belt type grain pick-up having front and rear conveyor rollers, a conveyor belt extending around said rollers and provided with flexible grain pick-up tynes, and a driven stripper roller for removing grain from said tynes, the improvement in which said stripper roller is located below said rear conveyor roller and means are provided for varying the angular relationship of the stripper and rear rollers relative to the ground, as defined by the intersection of a line tangential to the rear of the rear roller and to the front of the stripper roller and a line parallel to the surface of the ground, said means being adapted to maintain the stripper roller and rear roller at a constant spacing.

2. A grain pick-up according to claim 1 wherein the stripper and rear rollers are rotatably mounted in fixed spatial relationship in laterally spaced side bracket members of the pick-up, said members being adapted to be pivotally mounted on the reception table of a combine harvester.

3. A grain pick-up according to claim 2 wherein there is provided an adjustable means connected to at least one of the side bracket members and adapted to be connected to the combine harvester, in use adjustment of said adjustable means causing pivoting of said side bracket members and variation of said angular relationship.

4. A grain pick-up according to claim 3 wherein said adjustable means is at least capable of locating the stripper and rear rollers in position in which a tangent common thereto is at right angles to the ground.

5. A grain pick-up according to claim 1 wherein means are provided for removing material adhering to the stripper roller.

6. A grain pick-up according to claim 5 wherein said material removing means comprises an angle bar extending along the length of the stripper roller and adjacent thereto.

7. A grain pick-up according to claim 6 wherein said angle bar is adjustable in relation to the stripper roller.

8. A grain pick-up according to claim 1 wherein said nylon tynes have a major portion extending at a first acute angle from the belt and a minor end portion extending at a larger second acute angle to the inlet and the length of said major and minor portions and the said constant spacing are such that in use only the minor portions of the tynes contact the stripper roller.

9. A grain pick-up according to claim 1 in which a pair of side frames are rotatably mounted each by one end in a laterally spaced manner on the rear roller and in which the front roller is rotatably mounted in spherical bearings in the other ends of said side frames, thereby to allow twisting rotation of the pick-up during use thereof.

10. In a belt type grain pick-up having front and rear conveyor rollers, a conveyor belt extending around said rollers and provided with flexible grain pick-up tynes, and a driven stripper roller for removing grain from said tynes, the improvement in which said stripper roller is located below said rear conveyor roller and means are provided for moving said stripper and rear rollers simultaneously to vary their angular relationships relative to the ground, as defined by the intersection of a line tangential to the rear of the rear roller and to the front of the stripper roller and a line parallel to the surface of the gound, whilst maintaining said stripper roller and said rear roller at a constant spacing.

11. In combination a combine harvester and a grain pick-up, said harvester having a grain reception table, said pick-up having front and rear conveyor rollers, a conveyor belt extending around said rollers and provided with flexible grain pick-up tynes, and a driven stripper roller for removing grain from said tynes, said stripper being located below said rear conveyor rollers, and adjusting means acting between the pick-up and the havester to vary the angular relationship between the stripper and rear rollers relative to the ground, as defined by the intersection of a line tangential to the rear of the rear roller and to the front of the stripper roller and a line parallel to the surface of the ground.

12. The combination of claim 11 wherein the stripper and rear rollers are rotatably mounted in fixed spatial relationship in laterally spaced side bracket members of the pick-up, said members being adapted to be pivotably mounted on the reception table of the combine harvester.

13. The combination of claim 12 wherein there is provided an adjustable means connected to at least one of the side bracket members and connected to the combine harvester, in use adjustment of said adjustable means causing pivoting of said side bracket members and variation of said angular relationship.

14. The combination of claim 13 wherein said adjustable means is at least capable of locating the stripper and rear rollers in position in which a tangent common thereto is at right angles to the ground.

References Cited
UNITED STATES PATENTS

| | | | |
|---|---|---|---|
| 2,593,383 | 4/1952 | Beaver | 56—350X |
| 2,622,386 | 12/1952 | Randall | 56—350 |
| 2,815,524 | 12/1957 | Mitchell | 56—249X |

LOUIS G. MANCENE, Primary Examiner

J. N. ESKOVITZ, Assistant Examiner